United States Patent [19]
Al-Abdullateef

[11] Patent Number: 5,605,372
[45] Date of Patent: Feb. 25, 1997

[54] SAFETY SEAT SYSTEM

[76] Inventor: Abdulghafour Al-Abdullateef, P.O. Box 88897, Los Angeles, Calif. 90045

[21] Appl. No.: 324,245
[22] Filed: Oct. 14, 1994
[51] Int. Cl.⁶ .................................................. B60N 2/42
[52] U.S. Cl. ................................. 297/216.16; 297/216.1
[58] Field of Search ...................... 297/216.1, 216.15, 297/216.16, 216.19, 216.2, 317, 318, 344.1, 325, 329, 344.14, 261, 264–267, 261.1, 261.2, 261.3, 264.1, 265.1, 266.1, 267.1; 296/68.1

[56] References Cited

U.S. PATENT DOCUMENTS

| | | | |
|---|---|---|---|
| 144,603 | 11/1873 | Enger | 297/266 X |
| 1,774,555 | 9/1930 | Horsley et al. | 297/216.17 X |
| 2,102,979 | 12/1937 | Smith . | |
| 2,227,717 | 1/1941 | Jones | 296/68.1 X |
| 2,401,748 | 6/1946 | Dillon . | |
| 2,736,566 | 2/1956 | Hartl . | |
| 3,357,736 | 12/1967 | McCarthy . | |
| 3,531,153 | 9/1970 | Mohs | 296/68.1 |
| 3,610,679 | 10/1971 | Amato . | |
| 3,998,291 | 12/1976 | Davis . | |
| 4,085,963 | 4/1978 | Bullerdieck . | |
| 4,249,769 | 2/1981 | Barecki . | |
| 4,650,249 | 3/1987 | Serber . | |
| 4,790,599 | 12/1988 | Goldman . | |
| 4,842,232 | 6/1989 | Pipon et al. . | |
| 5,022,707 | 6/1991 | Beauvais et al. | 297/216.19 X |
| 5,110,182 | 5/1992 | Beauvais . | |
| 5,167,421 | 12/1992 | Yunzhao . | |
| 5,244,252 | 9/1993 | Serber . | |
| 5,366,269 | 11/1994 | Beauvais | 297/216.19 |

FOREIGN PATENT DOCUMENTS

| | | | |
|---|---|---|---|
| 537159 | 3/1959 | Belgium | 296/68.1 |
| 2596338 | 10/1987 | France | 297/216.19 |

*Primary Examiner*—Milton Nelson, Jr.
*Attorney, Agent, or Firm*—Fulwider Patton Lee & Utecht, LLP

[57] ABSTRACT

An automotive safety seat is provided that reduces g-loads imparted to an occupant during a collision by absorbing some of the energy of impact. Kinetic energy is converted to potential energy with the elevation of the seat and its occupant and the compression of springs.

8 Claims, 2 Drawing Sheets

SAFETY SEAT SYSTEM

BACKGROUND OF THE INVENTION

1. Field of the Invention

The present invention generally relates to automobile seats, and more particularly pertains to seating systems that reduce the risk of injury during a collision by absorbing some of the energy of impact.

2. Brief Description of the Drawings

A multitude of provisions are incorporated in the modern automobile that serve to reduce the g-loads that occupants are subjected to during a collision. This includes, among other things, energy absorbing bumpers, crumple zones, padded interior surfaces, seat belts, and relatively recently, air bags. The seats which, in fact, comprise the ultimate interface between the automobile and its occupant also include various safety-enhancing features. The padding in the seat helps to cushion some of the energy of an impact, while the seat's contoured structure serves to more evenly distribute some of the loads that are transmitted to its occupant.

Additionally, a multitude of seat designs have been devised that allow the seat to move forwardly while pivoting upwardly relative to the automobile during a frontal impact. Springs and shock absorbers associated with such movement serve to reduce the forces transferred to the occupant while the pivoting action serves to redirect g-loads relative to the human body toward areas more clipable of accommodating higher loads. A gimballed seating mechanism generally serves to transfer g-loads from the back to the seat.

While many of the above-referenced devices protect the occupant from the effects of frontal impacts, the effects of rear end collisions are not mitigated thereby. Despite the fact that most seating systems support the entire body, including the head and neck, whiplash, back injury and soft tissue damage are still a reality in severe rear-enders. It is therefore most desirable to provide a seating system that reduces the g-loads an occupant is subjected to in frontal, as well as rear end collisions.

SUMMARY OF THE INVENTION

The present invention provides an automotive seating system that reduces the g-loads an occupant is subjected to in frontal, as well as rear end collisions. Upon impact, the system causes the seat and its occupant to elevate to thereby convert some of the kinetic energy into potential energy. Additionally, springs are employed to control the rate of elevation which serves to absorb additional kinetic energy and to reduce the g-loads imparted to the occupant.

The system consists of a seat shiftably mounted to a base which in turn is rigidly mounted to the automobile. The front and rear supports for the seat are constrained to shift within arcuate paths when subjected to substantial accelerative or decelerative forces wherein any forward as well as afterward movement of the seat relative the base causes it and its occupant to elevate. Spring mechanisms extending between the seat and base control the rate and magnitude of such movement.

These and other features and advantages of the present invention will become apparent from the following detailed description of a preferred embodiment which, taken in conjunction with the accompanying drawings, illustrates by way of example the principles of the invention.

DETAILED DESCRIPTION OF THE PREFERRED EMBODIMENT

The drawings generally illustrate the safety seat system of the present invention. The system is mounted to an automobile in the conventional manner. In the event the automobile is involved in a collision, the g-loads the occupant would otherwise be subjected to are significantly reduced as the seating system absorbs a portion of the kinetic energy.

Figure 1:
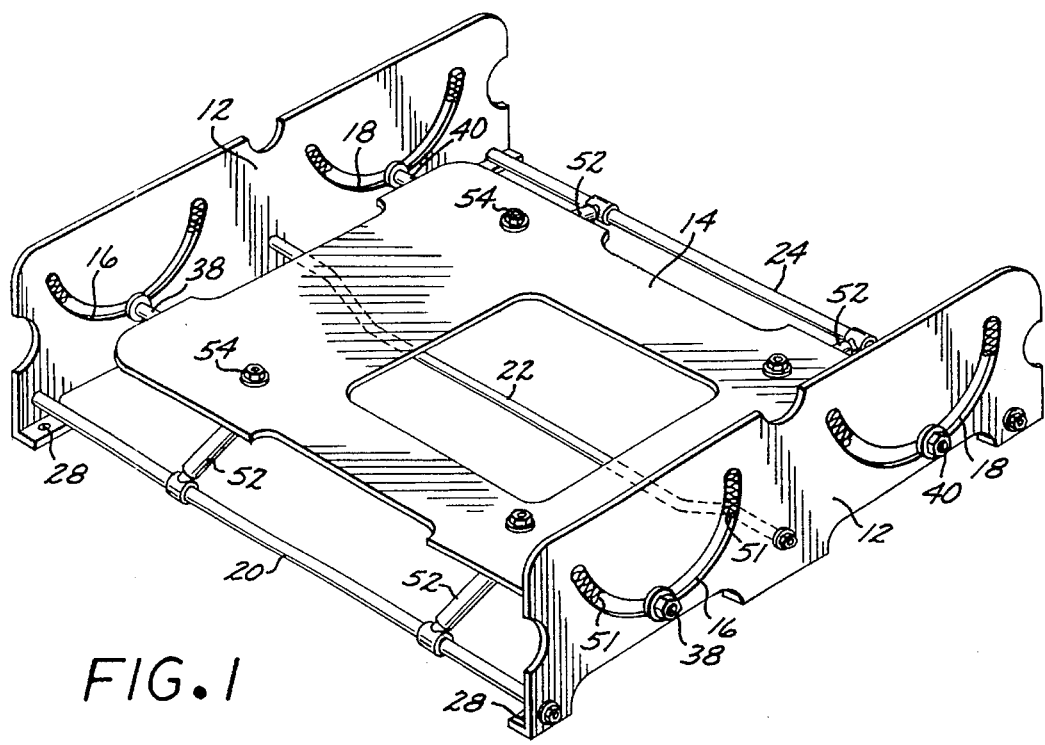
FIG. 1 is a perspective view of the seat support components of the seating system of the present invention.
Figure 2:
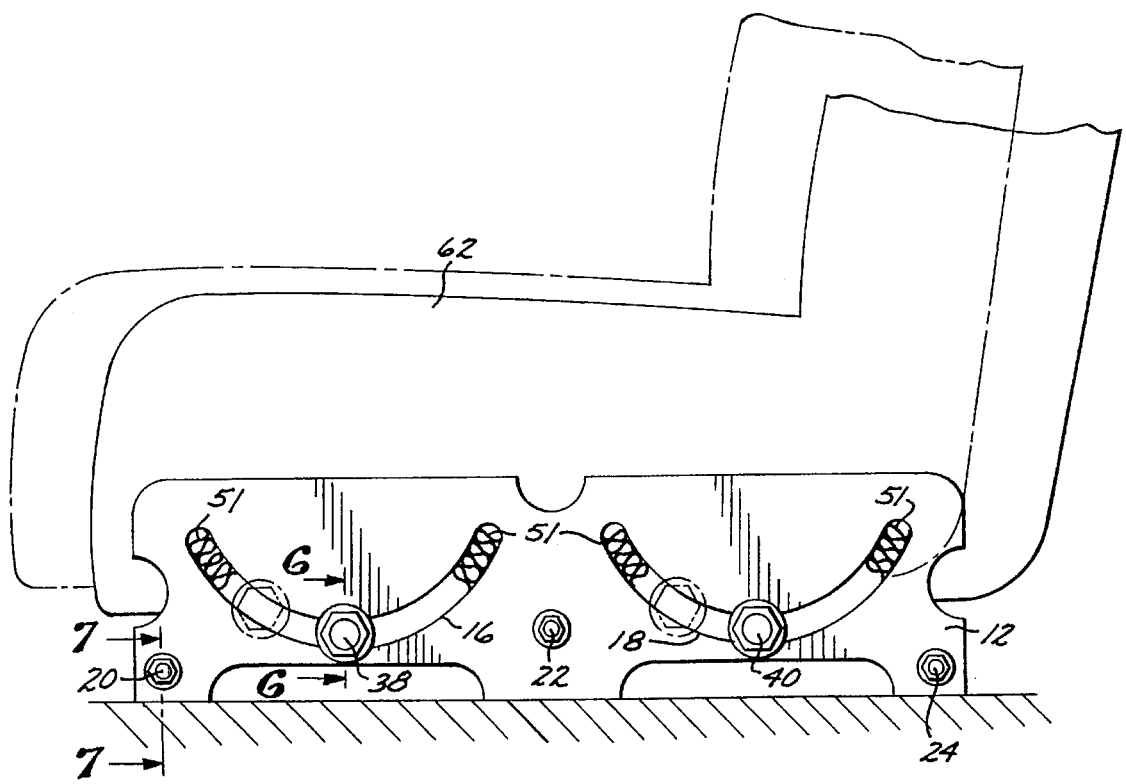
FIG. 2 is a side plan view of the system.
Figure 3:
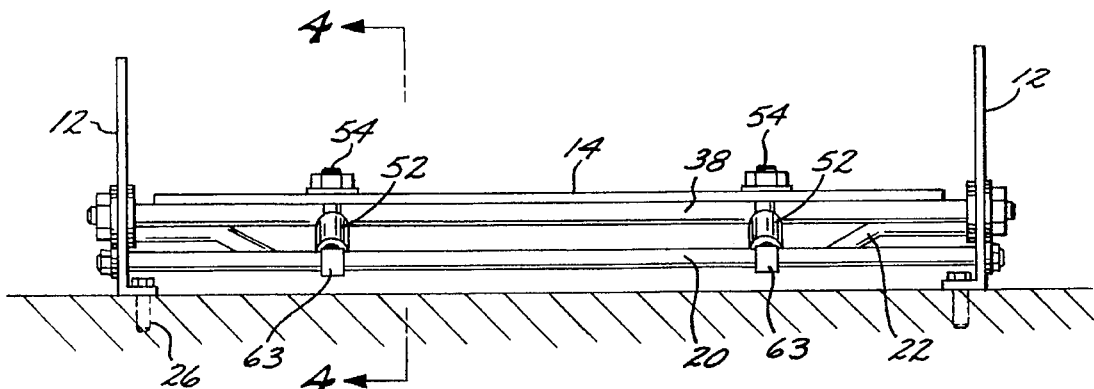
FIG. 3 is a front plan view of the system.
Figure 4:
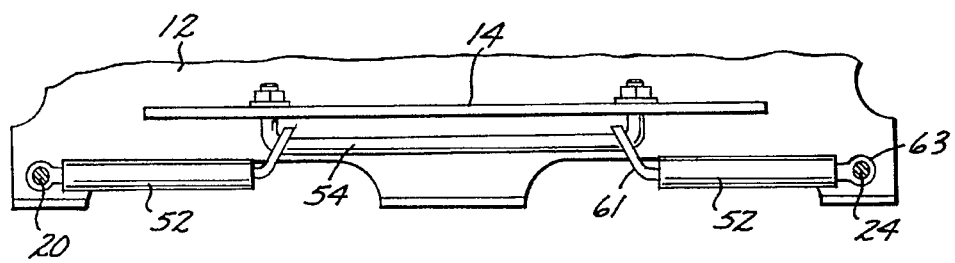
FIG. 4 is a cross-sectional view taken along line 4—4 of FIG. 3.
Figure 7:
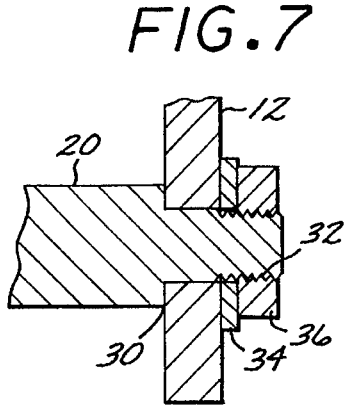
FIG. 7 is an enlarged cross-sectional view taken along line 7—7 of FIG. 2.

FIG. 1 is a perspective view of the support components to which the seat component is mounted, and which consist of side plates 12 and saddle plate 14. The side plates are disposed in a vertical position and are firmly attached to the automobile, preferably via a fore and aft adjustment track mechanism (not shown). Each plate has a pair of arcuate slots 16 and 18 formed therein. The side plates are attached to the vehicle by bolts 26 that extend through holes 28 as is apparent in FIG. 3. Three cross members 20, 22, and 24 extend between the side plates. Each end of each cross member is stepped 30 and threaded 32 and extends through the appropriate hole in the side plate where washers 34 and nuts 36 secure the assembly as shown in FIG. 7.

A pair of support rods 38 and 40 are rigidly attached to the bottom of saddle plate 14, preferably by welding. Each end of each support rod is stepped 42 and threaded 44 and is inserted through the appropriate arcuate slot 16, 18. Roller bushings 46 disposed about the stepped section of each rod encl maintain each support rod in position within the slots, as well as facilitate a fore and aft shifting therein while washers 48 and nuts 50 secure each rod end relative the side plate 12. Ribbon springs 51 are disposed within the arcuate slots to limit movement of the rod ends therein in a progressive manner.

Figure 5:
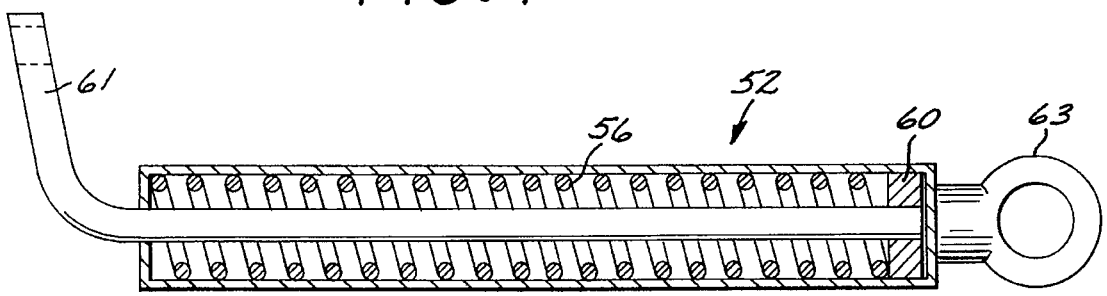
FIG. 5 is an enlarged cross-sectional view of the spring cartridge.
Figure 6:
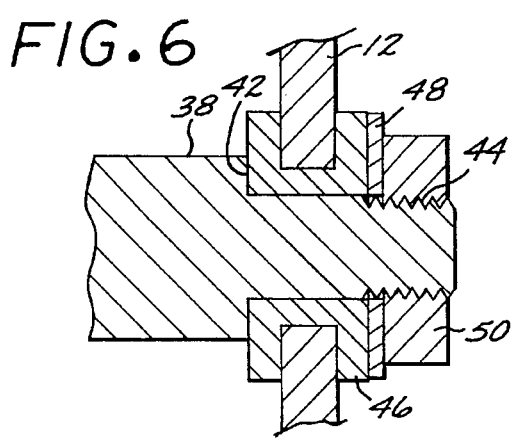
FIG. 6 is an enlarged cross-sectional view taken along line 6—6 of FIG. 2.

The position of the rod ends, within the arcuate slots 16, 18, and hence the position of the seat and saddle plate 14 relative the side plates 12 is maintained on center by the action gravity as the lowest point along each slot is at its center. Additionally, four spring cartridges 52, 58 exert a centering force on the saddle plate. Each cartridge is rotatably attached to a cross member 20, 24 on one end and slidably attached to U-bolt 54 at the other wherein such U-bolt is attached directly to the saddle plate. As is shown in FIG. 5, each spring cartridge contains a spring 56 therein that acts on a plunger 60 slidably positioned within the cartridge such that the spring compressed upon extension of the cartridge. The spring 56 is pre-loaded to maintain the cartridge fully contracted under sub-collision loads. Finally, the seat 62 is attached directly to the saddle plate by conventional means.

In operation, prior to being subjected to an impact, the accelerative and decelerative forces encountered in the normal operation of an automobile are insufficient to cause any significant shifting, and hence elevation of the seat. In the event the automobile is hit from the rear, the automobile, along with the side plates, is abruptly accelerated forwardly. Rather than transferring such force directly to the seat and its occupant, the forward projecting spring cartridges 52 are extended to compress springs 56 therein as the saddle plate, seat, and occupant momentarily remain stationary, while the upturned bracket 61 of each of the rearward projecting cartridges simply slide along U-bolt 54. As the saddle plate becomes displaced relative the side plates, the fore and aft support rods 38 and 40 shift within the slots 16, 18 to follow the arcuate path and elevate the entire seat 62 and its occupant. Some of the kinetic energy is thereby converted to potential energy in the form of the compression of the springs as well as elevation of the seat and its occupant. The time interval required for the rod ends to shift from their centered positions to the extreme ends of the slots serves to dilate the total time in which the seat and occupant are accelerated to the speed imparted to the automobile by the force of the collision to thereby reduce the net g-loads experienced by the occupant with a commensurate reduction in the potential for injury.

In a frontal impact, a similar chain of events transpires as the automobile is decelerated or accelerated rearwardly. The saddle plate, seat, and occupant move forward relative the side plates, while the springs 56 of the rearward projecting cartridge 58 are compressed. The same elevation of the seat and its occupant occurs which results in a reduction of the g-loads that the occupant would otherwise by subjected to.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A seating system within an automobile, comprising:

a base component rigidly affixed to said automobile;

a seat support component shiftably affixed to said base component;

a seat rigidly affixed to said seat support component, said seat having a substantially horizontal seating surface; and a mechanism for causing said seat support component to shift in an arcuate path relative to said base component and thereby elevate said seat while maintaining said seating surface substantially horizontal when the base component is subjected to a preselected accelerative force.

2. The seating system of claim 1 wherein said mechanism causes said support component to elevate when said force is exerted forwardly or rearwardly relative to the longitudinal axis of said automobile.

3. The seating system of claim 1 wherein springs maintain the support component stationary relative to said base component upon being subjected to less than said preselected forces.

4. The seating system of claim 3 wherein said springs are pre-loaded.

5. The seating system of claim 1 wherein the front and rear edges of the seat support component are each shiftable along said arcuate path relative said base component.

6. The seating system of claim 5 wherein the base component comprises two vertically disposed side plates arranged in parallel to one another and relative to the automobile's longitudinal axis, each of said side plates having two arcuate slots formed therein, said slots being arranged in tandem and oriented such that the ends of the slots extend upwardly.

7. The seating system of claim 6 wherein said seat support component is supported by rods extending therefrom through said arcuate slots formed in said side plates.

8. The seating system of claim 7 wherein springs control relative motion between said base component and said seat support component.

\* \* \* \* \*